(12) United States Patent
Stuever et al.

(10) Patent No.: US 11,772,219 B2
(45) Date of Patent: Oct. 3, 2023

(54) LOAD LIFTING DEVICE AND METHOD OF LIFTING LOAD

(71) Applicant: Akeratos, LLC

(72) Inventors: Merritt Stuever, Wichita, KS (US); Ujjeev Joel Koripalli, Wichita, KS (US)

(73) Assignee: Akeratos, LLC, Colwich, KS (US)

( * ) Notice: Subject to any disclaimer, the term of this patent is extended or adjusted under 35 U.S.C. 154(b) by 446 days.

(21) Appl. No.: 16/906,201

(22) Filed: Jun. 19, 2020

(65) Prior Publication Data

US 2021/0394324 A1 Dec. 23, 2021

(51) Int. Cl.
| | | |
|---|---|---|
| *B23Q 7/00* | (2006.01) | |
| *B23Q 7/04* | (2006.01) | |
| *B25J 15/00* | (2006.01) | |
| *B65G 7/00* | (2006.01) | |
| *B65G 9/00* | (2006.01) | |
| *B66C 1/28* | (2006.01) | |
| *B66C 1/42* | (2006.01) | |

(52) U.S. Cl.
CPC ............ *B23Q 7/005* (2013.01); *B23Q 7/043* (2013.01); *B23Q 7/046* (2013.01); *B25J 15/0028* (2013.01); *B65G 7/00* (2013.01); *B65G 9/00* (2013.01); *B66C 1/28* (2013.01); *B66C 1/42* (2013.01)

(58) Field of Classification Search
CPC ........ B23Q 7/005; B23Q 7/043; B23Q 7/046; B25J 15/0028; B65G 7/00; B65G 9/00; B66C 1/28; B66C 1/42
See application file for complete search history.

(56) References Cited

U.S. PATENT DOCUMENTS

| | | | | |
|---|---|---|---|---|
| 2,507,127 A | * | 5/1950 | True .................. | E21B 19/06 294/86.17 |
| 3,558,176 A | * | 1/1971 | Fathauer et al. ........ | B66C 1/223 294/81.51 |
| 5,280,980 A | * | 1/1994 | Coatta .................... | B66C 1/102 294/81.1 |
| 5,666,758 A | * | 9/1997 | Vaillier ................. | A01K 97/24 294/110.1 |
| 7,178,846 B2 | * | 2/2007 | Niskanen ............... | B66C 1/663 294/81.2 |
| 8,870,253 B2 | * | 10/2014 | Mongan ................... | B66C 1/42 294/67.1 |
| 10,981,757 B2 | * | 4/2021 | Stinis .................... | B66C 13/085 |
| 2014/0205420 A1 | * | 7/2014 | Newth ..................... | B66C 1/48 414/800 |

\* cited by examiner

*Primary Examiner* — Stephen A Vu

(74) *Attorney, Agent, or Firm* — Stinson LLP

(57) ABSTRACT

A load lifting device for lifting a load. The load lifting device includes a primary plate, a lifting attachment that receives a hook of an overhead suspender, and a clamping system that can clamp a load onto the lifting device between two jaws. The clamping system can have a coarse adjustment and a fine adjustment. The coarse adjustment selectively connects a jaw to the primary plate at a plurality of discrete connection points, and the fine adjustment mechanism selectively moves a contact point of the first jaw toward a first end portion of the load. A method for lifting a load includes positioning the load lifting device horizontally above a load, clamping the load with a clamping system, and imparting a vertical force on an end portion of the load lifting device to rotate it from horizontal to vertical.

29 Claims, 5 Drawing Sheets

LOAD LIFTING DEVICE AND METHOD OF LIFTING LOAD

FIELD

The present disclosure generally relates to a load lifting device; more specifically, a load lifting device that lifts a load from a horizontal orientation to a vertical orientation.

BACKGROUND

In machine shops, work pieces (broadly, loads) comprising rectangular pieces of metal must be moved from a storage location into operative relationship with a machine for machining the material. Modern machine shops typically include automated milling machines (e.g., computer numeric control (CNC) mills) for machining metal work pieces. Conventional milling machines—also called vertical milling machines—are oriented so that the spindle axis extends vertically. In this configuration, the broad side of the work piece is typically laid down on a tabletop-type fixture to operatively position the material for being machined. While this configuration facilitates relatively easy loading of the material into the machine, a known drawback of these types vertical milling machines is that the metal swarfs formed during machining build up on the surface of the part. That is, the milling machine removes material from the top surface of the material, which can cause the swarfs to build up on the top surface throughout the process.

By contrast, horizontal milling machines—e.g., milling machines configured so that the spindle axis extends horizontally—enable the work piece to be loaded in a vertical orientation. More particularly, horizontal milling machines include fixtures known as tombstones that hold the work piece in the vertical orientation, in operative relationship with the milling head. As the milling cutter works against a vertical surface of the work piece held by the tombstone, the swarfs fall downward along the surface, out of the way of the cutter.

BRIEF SUMMARY

In one aspect, a load lifting device for lifting a load having opposite first and second end portions comprises a primary plate. The primary plate comprises first and second end portions spaced apart along an axis of the primary plate. A lifting attachment on the first end portion of the plate is configured to couple to an overhead suspender to suspend the load lifting device from the overhead suspender such that the axis of the primary plate extends generally vertically. A clamping system comprises first and second jaws configured to be connected to the primary plate in spaced apart relation along the axis of the primary plate such that the first jaw grips the first end portion of the load and the second jaw grips the second end portion of the load to clamp the load between the first and second jaws and thereby hold the load on the primary plate when the lifting attachment suspends the load lifting device from the suspender.

In another aspect, a method for lifting a load having opposite first and second end portions comprises positioning a load lifting device in a horizontal orientation above a load. The load is clamped with a clamping system of the load lifting device while the load lifting device is in the horizontal orientation above the load. A vertical force is imparted on an end portion of the load lifting device, whereby the load lifting device rotates from the horizontal orientation to a vertical orientation and suspends the load.

Other aspects and features will be apparent hereinafter.

BRIEF DESCRIPTION OF THE DRAWINGS

For a better understanding of the nature and objects of the disclosure, reference should be made to the following detailed description taken in conjunction with the accompanying drawings, in which.

Reference is made in the following detailed description of preferred embodiments to accompanying drawings, which form a part hereof, wherein like numerals may designate like parts throughout that are corresponding and/or analogous. It will be appreciated that the drawings. have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

The inventors have recognized that machine shops can find difficulty loading work pieces onto a tombstone of a horizontal mill. Work pieces are typically stored in a stack, with each work piece supported on the stack in a horizontal orientation. It can be difficult to lift large and/or heavy work pieces from the horizontal stack and then reorient them vertically in operative alignment with a tombstone.

Figure 1:
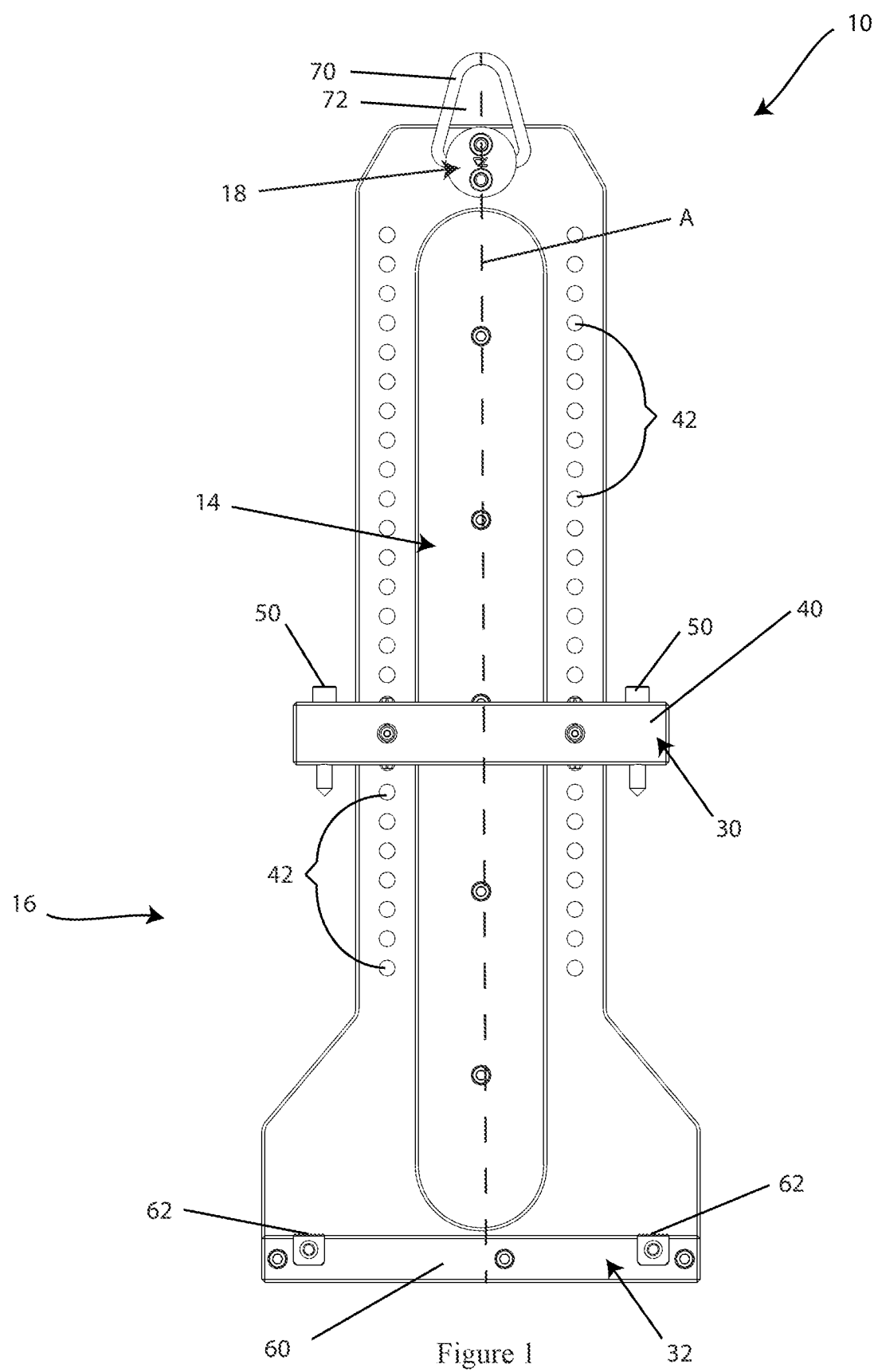
FIG. 1 is a front elevation of a load lifting device.
Figure 2:
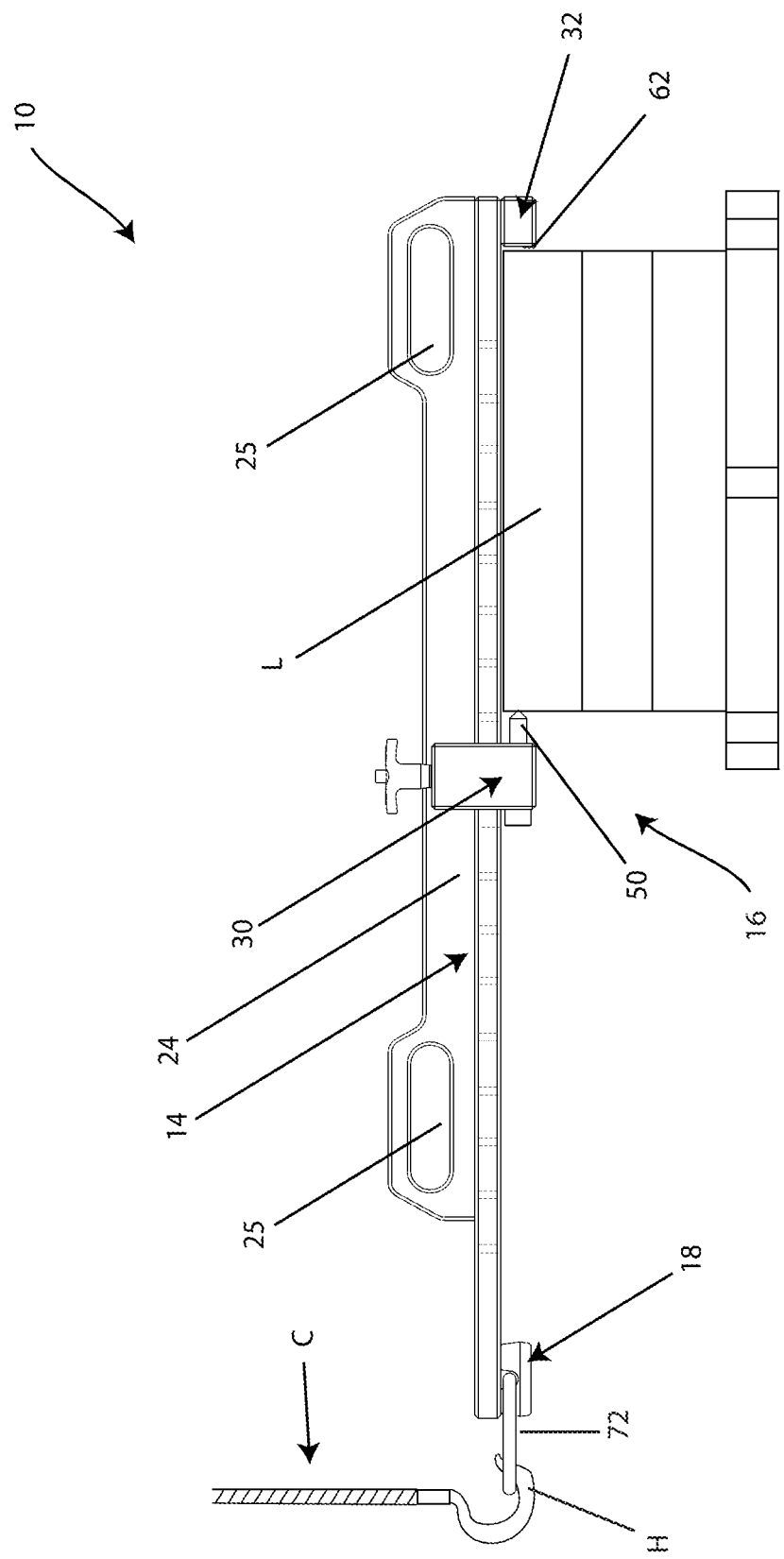
FIG. 2 is a side elevation of the lifting device positioned horizontally above a stack of work pieces.
Figure 3:
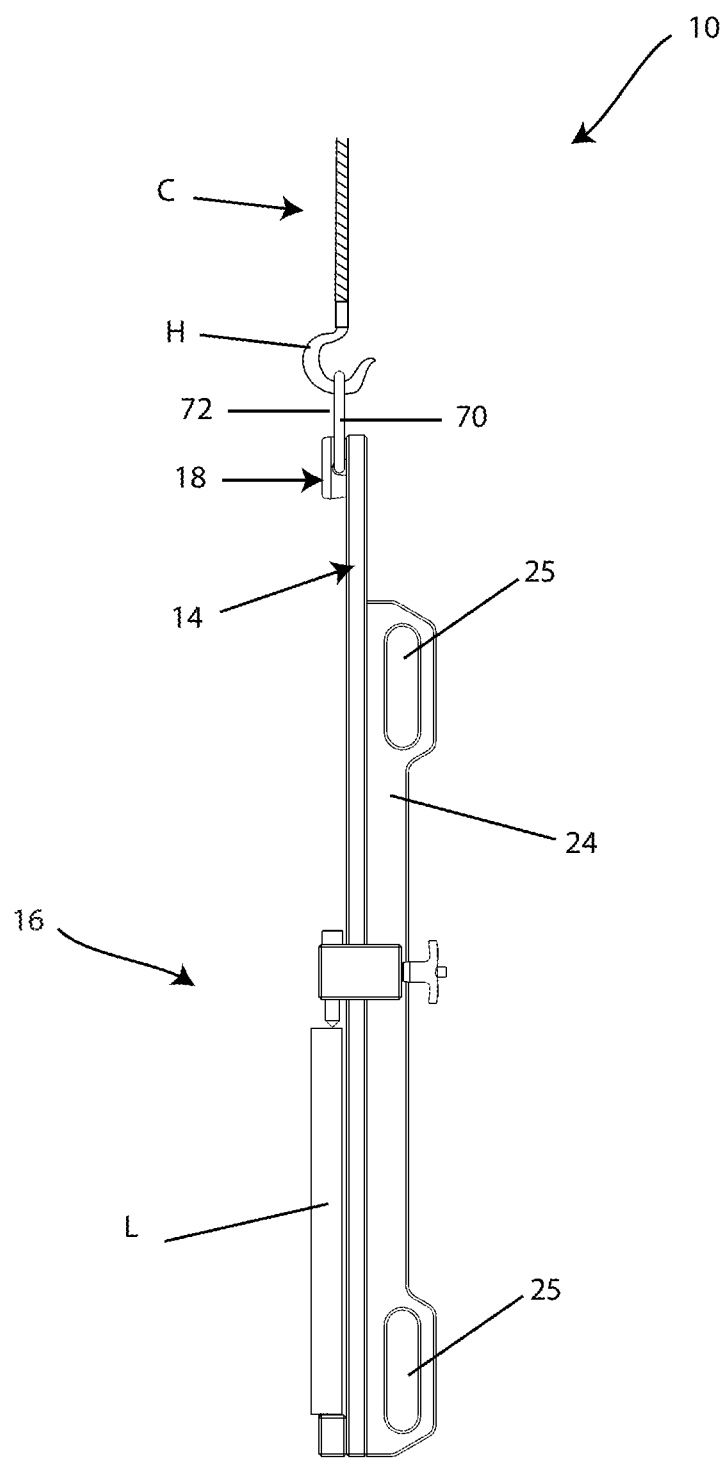
FIG. 3 is a side elevation of the lifting device after lifting one of the work pieces off of the stack.
Figure 4:
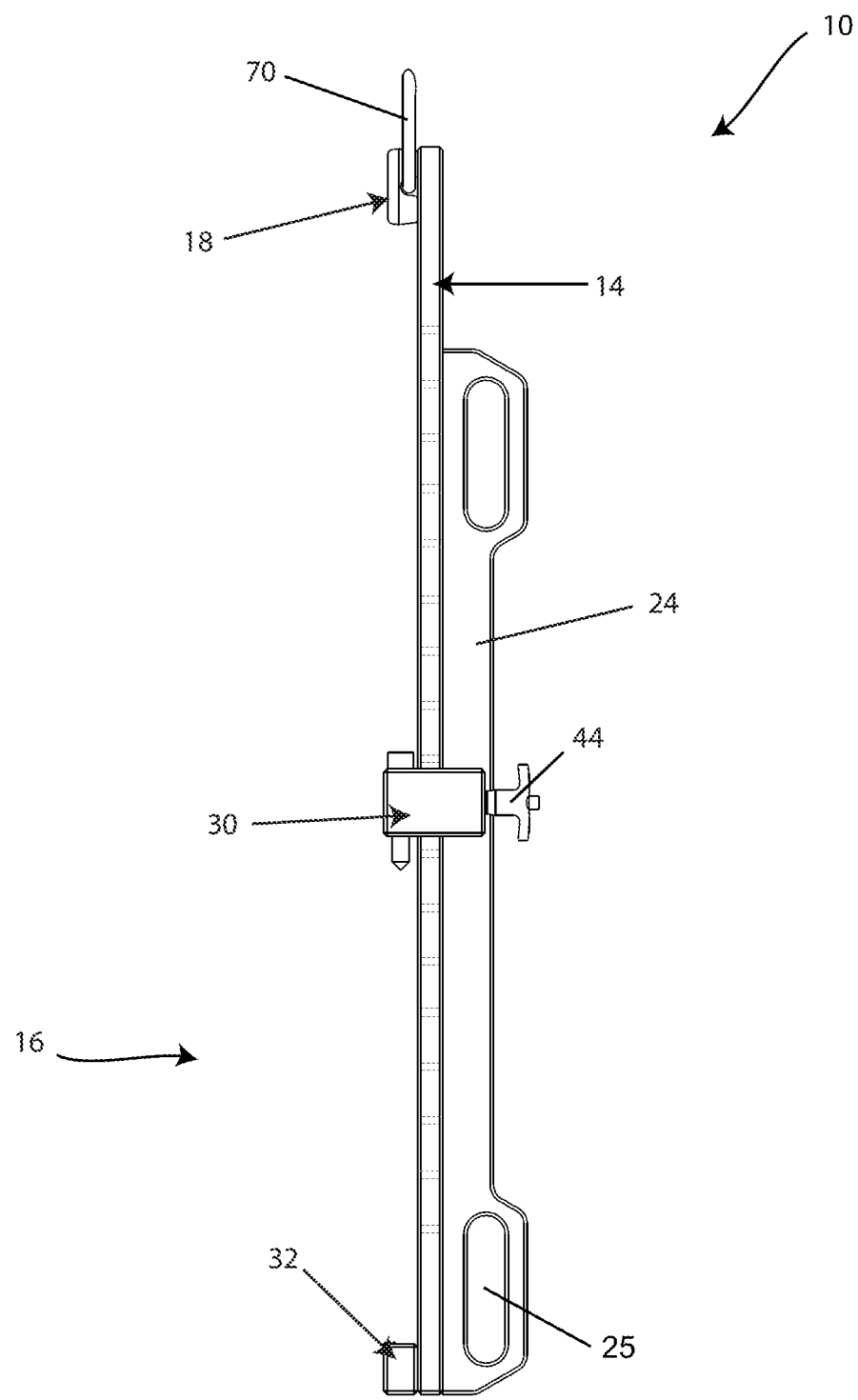
FIG. 4 is a side elevation of the load lifting device.
Figure 5:
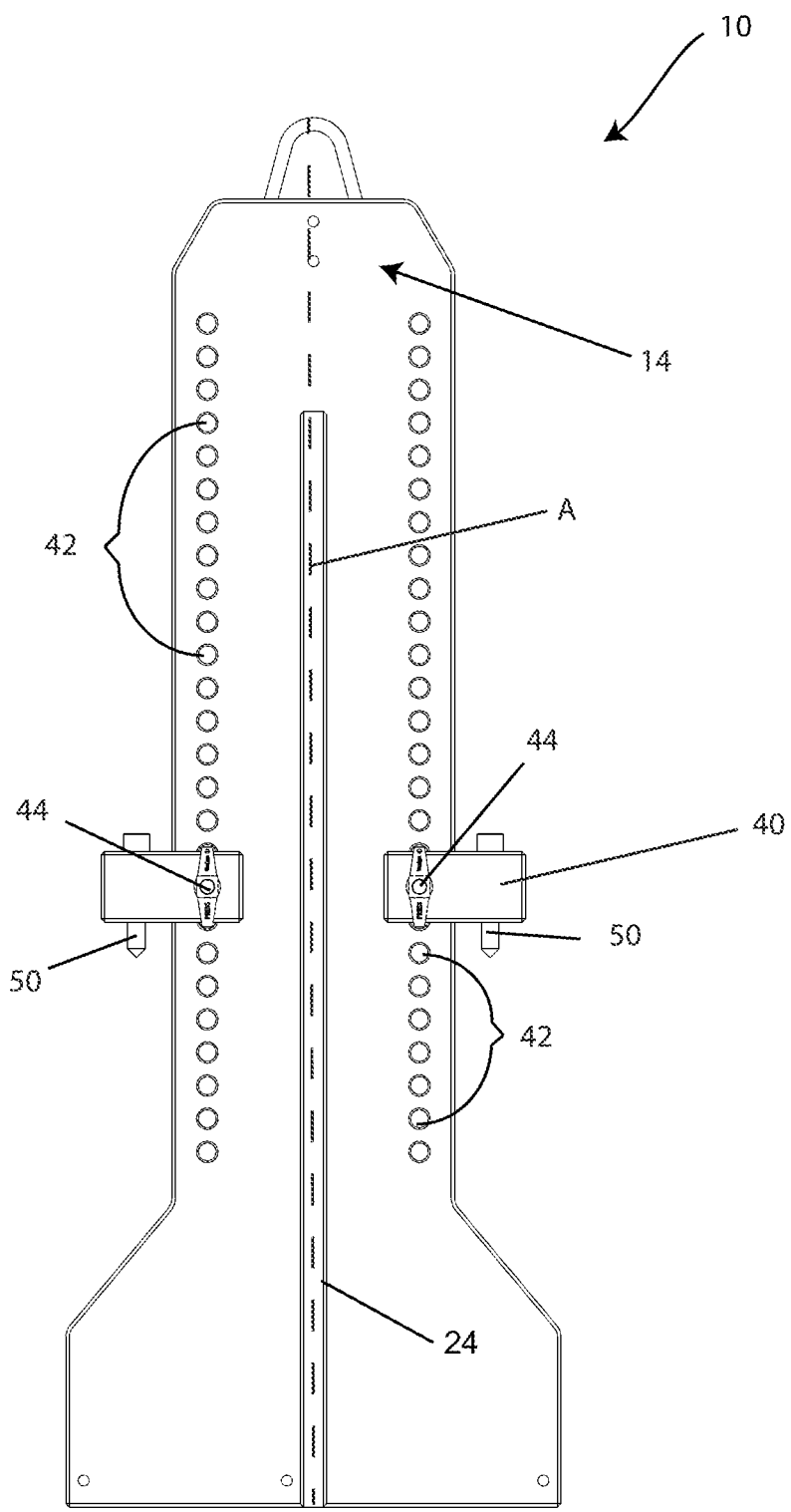
FIG. 5 is a rear elevation of the load lifting device.

Referring to FIGS. 1-3, to address these and other technical problems, the inventors have devised a load lifting device 10 for lifting a load L, such as a work piece, from a substantially horizontal orientation to a substantially vertical orientation. Throughout this disclosure, the load lifting device 10 is described as used in a machine shop setting, for loading a work piece L onto a machine such as a horizontal milling machine. But it will be understood that the load lifting device can also be used for lifting other types of loads. The load lifting device 10 generally comprises a primary plate 14, a clamping system 16, and a lifting attachment 18. As will be explained in further detail below, the clamping system 16 is configured to clamp onto a work piece L to connect the work piece to the primary plate 14, at which point the load lifting device can be lifted upward via the lifting attachment 18 to suspend the work piece from a suspender such as an overhead crane C in a vertical orientation. Once the work piece L is suspended by the lifting device, an individual user can easily position the work piece into registration with a tombstone by manually moving the lifting device and the work piece together while they are suspended by the overhead crane C.

Referring to FIGS. 1-5, the primary plate 14 of the load lifting device 10 has a generally elongate shape, comprising an upper end portion (broadly, first end portion) and a lower end portion (broadly, a second end portion) spaced apart along an axis A. Throughout this disclosure, terms describing relative vertical positions, such as 'upper' and 'lower,' are used in reference to the load lifting device when oriented in its vertical orientation as shown, for example, in FIGS. 1 and 3. The load lifting device 10 also has a horizontal orientation shown in FIG. 2, which will be described in further detail below. The primary plate 14 comprises opposite longitudinal edge margins spaced apart along a width of the primary plate and opposite front and back sides spaced apart along a thickness of the primary plate. In the illustrated embodiment, the longitudinal edge margins extend generally parallel to the axis A from the upper end portion to the lower end portion. Suitably, the primary plate is formed from a rigid material such as aluminum or steel that is capable of supporting the weight of heavy work pieces L. The clamping system 16 extends forward from the front side of the primary plate 14.

The illustrated load lifting device 10 further comprises a spine 24 on the rear side of the primary plate 14. In one or more embodiments, the spine 24 comprises a second elongate plate that is fastened to the primary plate 14 such that the spine extends lengthwise along the axis A at a location roughly equidistant widthwise between the opposite longitudinal edge margins of the primary plate. In an embodiment, the spine 24 extends in a plane oriented generally perpendicular to the primary plate 14. The spine 24 reinforces the primary plate 14 against bending while the primary plate is supporting a load. In the illustrated embodiment, the spine 24 comprises handle openings 25 that enable the user to manipulate the lifting device from the rear side, opposite the work piece, during use.

The clamping system 16 comprising upper and lower jaws 30, 32 (broadly, first and second jaws) configured to be connected to the primary plate 14 in spaced apart relationship along the axis A of the primary plate such that the upper jaw grips a first end portion of a work piece and the lower jaw grips a second end portion of the work piece. As explained more fully below, the clamping system 16 thereby clamps the work piece L between the jaws 30, 32 and holds the work piece on the primary plate 14. Then when the lifting device 10 is suspended by the lifting attachment 18, the lifting device suspends the work piece in a vertical orientation (e.g., lifting device and the work piece are suspended together in the vertical orientation from a suspender such as an overhead crane C).

In general, the clamping system 16 comprises a coarse adjustment and a fine adjustment. The coarse adjustment is broadly configured to selectively connect at least one of the jaws 30, 32 to the primary plate 14 at a plurality of discrete connection points spaced apart along the axis A of the primary plate. In the illustrated embodiment, the upper jaw 30 is a movable jaw and the lower jaw 32 is a stationary jaw. However, it will be understood that in other embodiments the lower jaw can be movable in addition to, or as an alternative to, the upper jaw being movable. In the illustrated embodiment, the movable upper jaw 30 comprises a block 40 and the coarse adjustment mechanism includes a plurality of holes 42 formed through the thickness of the primary plate 14 at respective locations spaced apart along the axis A. In particular, the illustrated primary plate 14 comprises two rows of holes 42 along the axis A, one located adjacent each longitudinal edge margin of the primary plate. The set of holes 42 in both rows are located at about the same axially spaced locations along the axis A such that the two rows of holes define a plurality of hole pairs at spaced apart locations along the axis. Each of these hole pairs defines a respective connection point of the coarse adjustment mechanism of the clamping system 16.

The coarse adjustment mechanism further comprises a pair of removable fasteners 44 (FIGS. 4-5) configured to selectively couple to the block 40 to the primary plate 14 at any of the plurality of hole pairs to adjust the coarse distance between the upper jaw 30 and the lower jaw 32 along the axis A. In the illustrated embodiment, each removable fastener 44 that couples the block 40 to the primary plate 14 via an attachment hole 42 comprises a pin (e.g., a pin with a spring-loaded ball bearing locking element), and the block comprises a pin socket configured to mateably receive the pin. That is, in the illustrated embodiment, the block 40 comprises a pair of pin sockets (not shown) formed in the rear side of the block at locations that are spaced apart widthwise along the block by a distance that corresponds with the distance between the two holes 42 in each hole pair. Although the illustrated coarse adjustment mechanism uses hole pairs and two fasteners 44 to secure the upper jaw 30 to the primary plate 14 at discrete spaced apart locations, it will be understood that other embodiments can have other configurations without departing from the scope of the disclosure. For instance, it is expressly contemplated that coarse adjustments can have connection points defined by only a single row of holes along the axis of the primary plate or more than two rows of holes.

In the illustrated embodiment, the block 40 of the upper jaw has a C-shaped cross-sectional shape in horizontal cross-section. The C-shaped cross-sectional shape configures the block for slidable connection to the primary plate 14 so that it can slide vertically along a narrow upper section of the primary plate 14 to each of the connection points defined by a respective pair of holes 42. More particularly, the illustrated block 40 comprises a front portion that extends widthwise from a first lateral end protruding laterally beyond the first longitudinal edge margin of the primary plate 14 to a second lateral end protruding laterally beyond the second longitudinal edge margin of the primary plate. First and second side portions of the illustrated block 40 extend rearward from the first and second lateral ends of the front portion to rear ends spaced apart rearward of the rear side of the primary plate 14. The block 40 further comprises first and second rear portions that extend laterally inward from rear ends of the first and second side portions to inboard ends that are laterally spaced apart from one another. In the illustrated embodiment the holes for the pins 44 extend along respective front-to-back axes through the rear and front portions of the C-shaped block 40. Accordingly, in use, each pin 44 extends through a respective rear portion of the block 40, then through a respective hole 42 in the primary plate 14, such that an end portion of the pin is received in the front portion of the block. Although the illustrated block 40 has a C-shaped configuration, it will be understood that other movable blocks could have other shapes without departing from the scope of this disclosure.

The fine adjustment mechanism of the clamping system 16 is broadly configured to selectively move a contact point of the upper jaw 30 toward the work piece L when the coarse adjustment mechanism connects the upper jaw at any of the plurality of discrete connection points defined by the holes 42. In the illustrated embodiment, the upper jaw 30 comprises a pair of set screws 50 threadedly received in the block 40. The tip of each set screw 50 defines the contact point that can be adjusted toward the work piece L after the upper jaw 30 is positioned using the coarse adjustment mechanism. Although the illustrated fine adjustment mechanism uses two set screws 50, it will be understood that other embodiments can have other numbers of set screws (e.g., one or more) without departing from the scope of the disclosure. The illustrated set screws 50 extend vertically through the block 40 at locations that are spaced apart widthwise along the block. The locations are suitably defined by pre-threaded vertical holes formed in the block 40. The head of each set screw 50 defines the upper end portion of the set screw and a tapered or conical tip defines the lower end portion. Each set screw 50 is configured to be threadably advanced into engagement with an end portion of the work piece L, thereby pressing the work piece against the lower jaw 32. In an exemplary embodiment, the set screws 50 are configured to bite into the end portion of the work piece L such that the free end or tip of each set screw is partially embedded or recessed into the work piece end.

As explained above, in the upper jaw 30, the set screws 50 define the contact members configured to contact the work piece L during use. Similar to the upper jaw 30, the lower jaw 32 likewise comprises a block 60 and one or more contact members 62 (in the illustrated example, two contact members) configured to directly contact the work piece L during use. Thus, in the illustrate embodiment, the contact members 62 are supported on the upper surface of the lower jaw 32. In one or more embodiments, the contact members 62 of one or both of the upper and lower jaws 30, 32 are formed from a harder material than the block 40, 60 on which they are supported. For example, in one or more embodiments, the set screws and contact members are formed from a steel and each block is formed from an aluminum.

It can be seen that the clamping system 16 is selectively adjustable to enable the lifting device 10 to support work pieces L of various sizes and shapes. For example, in one or more embodiments, the clamping system 16 is configured to hold various work pieces L having any distance between two opposite end portions thereof (i.e., the end portions where the jaws will contact the work piece) in a range of at least from 12 inches to 30 inches (e.g., in a range of at least from 10 inches to 32 inches). In the illustrated embodiments, the lifting device can support work pieces up to 400 pounds, though other embodiments can be rated for other maximum-weight work pieces.

In the illustrated embodiment, the lifting attachment 18 comprises a lifting shackle. Other embodiments can use other structures for the lifting device attachment (e.g., a simple hole through upper end portion of the primary plate) without departing from the scope of the disclosure. The shackle 18 includes a rod 70 formed into a loop that is configured to receive a hook H of an overhead crane C, thereby connecting the lifting device to the crane such that the lifting device can be suspended from the crane as shown in FIG. 3. Suitably, the loop 70 extends in a plane that runs widthwise of the primary plate 14. In the configuration shown, the loop 70 defines an opening 72 that extends through the shackle along an axis oriented transverse (e.g., perpendicular) to the primary plate. In one or more embodiments, the loop 70 can be pivotable with respect to the primary plate 14 about a horizontal axis such that the orientation of the loop and the opening 72 can change during use. The illustrated orientation of the lifting shackle 18 is thought to be advantageous for using the lifting device 10 to rotate work pieces L from the horizontal orientation shown in FIG. 2 to the vertical orientation shown in FIG. 3. A hook H (or loop) of an overhead crane system C can be inserted into the opening 72 of the shackle 18 such that the crane hook extends in a plane oriented generally perpendicular to the primary plate 14 (e.g., the hook extends in a generally front-to-back oriented plane). As such, the lifting device 10 is permitted to rotate relative to the hook H about an axis that extends generally widthwise with respect to the primary plate 14, e.g., an axis that extends widthwise generally through an upper end portion of the shackle rod 70.

An exemplary method of using the lifting device 10 will now be described. Referring to FIG. 2, initially, work pieces L are arranged in a stack, with each work piece in a horizontal orientation. A user of the lifting device 10 first uses the coarse adjustment mechanism to position the upper jaw 30 so that the distance between the upper and lower jaws 30, 32 is slightly greater than the distance between opposite first and second end portions of the work piece L to be lifted. With the jaws 30, 32 properly spaced, the user positions the lifting device 10 in a horizontal orientation, front-face-down above the stack of work pieces L so that the top work piece is located in the gap between the upper and lower jaws with the upper jaw opposing the first end portion of the work piece and the lower jaw opposing the second end portion of the work piece. This step of positioning the lifting device 10 in the horizontal orientation above the work piece L can be performed before or after the hook H of the overhead crane C is coupled to the shackle 18. After setting the coarse position of the jaw 30 and positioning the load lifting device 10 horizontally as shown in FIG. 2, the user then tightens the set screws 50 to clamp the work piece L between the jaws 30, 32. If the crane hook H has not already been coupled to the shackle 18, the user inserts the hook.

Subsequently, the user imparts a vertical force on the lifting device 10 via the crane C. The lifting force is transferred through the shackle 18 to the upper end portion of the primary plate 14 and further to the work piece L. This lifts the upper end portion of the lifting device 10 upward, causing the primary plate 14 to become gradually more inclined until it reaches a vertical orientation. The work piece L, clamped in place by the clamping system 16, moves conjointly with the lifting device 10 as the lifting device moves from the horizontal orientation to the vertical orientation. Additionally, as the lifting device 10 moves from the horizontal orientation to the vertical orientation, it can rotate relative to the hook H about the axis extending through the upper portion of the shackle rod 70. Eventually, the crane C lifts the lifting device 10 and the work piece L so that the two are suspended in the air together. The user can then use the handles 25 to move the suspended device 10 and work piece L together as required for the user's purposes. For example, in an exemplary embodiment the user moves the suspended assembly into registration with a tombstone of a horizontal mill. The work piece L can be released form the lifting device 10 by loosening the set screws 50. The lifting device 10 can then be used to lift another work piece L.

The foregoing description has been presented for the purposes of illustration and description. It is not intended to be exhaustive or to limit the disclosure to the precise form disclosed. Many modifications and variations are possible in view of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and in its operation can be made by those skilled in the art without departing in any way from the spirit of the present disclosure.

Furthermore, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed, many modifications and variations are possible in view of the above teachings. The embodiments were chosen and described in order to best explain the principles of the disclosure and its practical applications, to thereby enable others skilled in the art to best utilize the disclosed system and method, and various embodiments with various modifications as are suited to the particular use contemplated.

The invention claimed is:

1. A load lifting device for lifting a load having opposite first and second end portions, the load lifting device comprising:
   a primary plate, the primary plate comprising first and second end portions spaced apart along an axis of the primary plate;
   a lifting attachment on the first end portion of the plate configured to couple to an overhead suspender to suspend the load lifting device from the overhead suspender such that the axis of the primary plate extends generally vertically; and
   a clamping system comprising first and second jaws configured to be connected to the primary plate in spaced apart relation along the axis of the primary plate such that the first jaw grips the first end portion of the load and the second jaw grips the second end portion of the load to clamp the load between the first and second jaws and thereby hold the load on the primary plate when the lifting attachment suspends the load lifting device from the suspender;
   wherein the first jaw comprises a set screw configured to be threadedly advanced into engagement with the first end portion of the load.

2. The load lifting device of claim 1, wherein the set screw is configured to bite into the first end portion of the load such that a free end of the set screw is partially embedded into the load.

3. The load lifting device of claim 1, wherein the set screw comprises a plurality of set screws configured to be threadedly advanced into engagement with the first end portion of the load.

4. The load lifting device of claim 1, wherein each of the first and second jaws comprises a block and the set screw is secured to the block, the set screw being configured to engage the load such that the block is spaced apart from the load, the set screw being formed from a harder material than the block.

5. The load lifting device of claim 4, wherein the set screw comprises steel and the block comprises aluminum.

6. The load lifting device of claim 1, wherein the lifting attachment comprises a lifting shackle, the lifting shackle comprising a loop extending in a plane that runs widthwise of the primary plate.

7. The load lifting device of claim 1, wherein the first jaw is a movable jaw and the second jaw is a stationary jaw.

8. The load lifting device of claim 1, wherein the clamping system is configured to hold loads having a distance between the first and second end portions in a range of at least from 12 inches to 30 inches.

9. A load lifting device for lifting a load having opposite first and second end portions, the load lifting device comprising:
   a primary plate, the primary plate comprising first and second end portions spaced apart along an axis of the primary plate;
   a lifting attachment on the first end portion of the plate configured to couple to an overhead suspender to suspend the load lifting device from the overhead suspender such that the axis of the primary plate extends generally vertically; and
   a clamping system comprising first and second jaws configured to be connected to the primary plate in spaced apart relation along the axis of the primary plate such that the first jaw grips the first end portion of the load and the second jaw grips the second end portion of the load to clamp the load between the first and second jaws and thereby hold the load on the primary plate when the lifting attachment suspends the load lifting device from the suspender;
   wherein the clamping system comprises a coarse adjustment mechanism and a fine adjustment mechanism, the coarse adjustment mechanism configured to selectively connect the first jaw to the primary plate at a plurality of discrete connection points spaced apart the axis of the primary plate, the fine adjustment mechanism configured to selectively move a contact point of the first jaw toward the first end portion of the load when the coarse adjustment mechanism connects the first jaw at any of the plurality of discrete connection points.

10. The load lifting device of claim 9, the first jaw comprises a block and the fine adjustment mechanism comprises a screw threadedly received in the block.

11. The load lifting device of claim 9, wherein the first jaw comprises a block and each discrete connection point comprises a hole formed through the primary plate at a respective location along the axis, the coarse adjustment mechanism further comprising a removable fastener configured to extend through each of the holes and couple to the block.

12. The load lifting device of claim 11, the removable fastener comprising a pin and the block comprising a pin socket configured to mateably receive the pin.

13. The load lifting device of claim 9, wherein the first jaw is a movable jaw and the second jaw is a stationary jaw.

14. The load lifting device of claim 9, wherein the clamping system is configured to hold loads having a distance between the first and second end portions in a range of at least from 12 inches to 30 inches.

15. The load lifting device of claim 9, wherein the lifting attachment includes a hook opening configured to receive a hook of the suspender, the hook opening extending along an axis oriented transverse to the primary plate.

16. The load lifting device of claim 9, wherein the primary plate comprises a spine.

17. The load lifting device of claim 16, wherein the spine comprises handle openings.

18. A method for lifting a load having opposite first and second end portions, the method comprising:
   positioning the load lifting device of claim 9 in a horizontal orientation above a load,
   clamping the load with a clamping system of the load lifting device while the load lifting device is in the horizontal orientation above the load,
   imparting a vertical force on an end portion of the load lifting device, whereby the load lifting device rotates from the horizontal orientation to a vertical orientation and suspends the load.

19. The method of claim 18, further comprising moving the load lifting device and the load conjointly while the load lifting device suspends the load.

20. The method of claim 19, wherein said moving the load comprises moving the load into register with a tombstone of a milling machine.

21. The method of claim 18, wherein said rotation of the load lifting device from said horizontal orientation to the said vertical orientation rotates the load from a horizonal orientation to a vertical orientation.

22. The load lifting device of claim 9, wherein the first jaw comprises a set screw configured to be threadedly advanced into engagement with the first end portion of the load.

23. The load lifting device of claim 22, wherein the set screw is configured to bite into the first end portion of the load such that a free end of the set screw is partially embedded into the load.

24. The load lifting device of claim 9, wherein each of the first and second jaws comprises a block and a contact member secured to the block, the contact member being configured to engage the load such that the block is spaced apart from the load and the contact member being formed from a harder material than the block.

25. The load lifting device of claim 24, wherein the contact member comprises steel and the block comprises aluminum.

26. The load lifting device of claim 9, wherein the lifting attachment comprises a lifting shackle, the lifting shackle comprising a loop extending in a plane that runs widthwise of the primary plate.

27. A load lifting device for lifting a load having opposite first and second end portions, the load lifting device comprising:
   a primary plate, the primary plate comprising first and second end portions spaced apart along an axis of the primary plate;
   a lifting attachment on the first end portion of the plate configured to couple to an overhead suspender to suspend the load lifting device from the overhead suspender such that the axis of the primary plate extends generally vertically; and
   a clamping system comprising first and second jaws configured to be connected to the primary plate in spaced apart relation along the axis of the primary plate such that the first jaw grips the first end portion of the load and the second jaw grips the second end portion of the load to clamp the load between the first and second jaws and thereby hold the load on the primary plate when the lifting attachment suspends the load lifting device from the suspender;
   wherein each of the first and second jaws comprises a block and a contact member secured to the block, the contact member being configured to engage the load such that the block is spaced apart from the load and the contact member being formed from a harder material than the block.

28. The load lifting device of claim 27, wherein the contact member comprises steel and the block comprises aluminum.

29. A load lifting device for lifting a load having opposite first and second end portions, the load lifting device comprising:
   a primary plate, the primary plate comprising first and second end portions spaced apart along an axis of the primary plate;
   a lifting attachment on the first end portion of the plate configured to couple to an overhead suspender to suspend the load lifting device from the overhead suspender such that the axis of the primary plate extends generally vertically; and
   a clamping system comprising first and second jaws configured to be connected to the primary plate in spaced apart relation along the axis of the primary plate such that the first jaw grips the first end portion of the load and the second jaw grips the second end portion of the load to clamp the load between the first and second jaws and thereby hold the load on the primary plate when the lifting attachment suspends the load lifting device from the suspender;
   wherein the lifting attachment comprises a lifting shackle, the lifting shackle comprising a loop extending in a plane that runs widthwise of the primary plate.

* * * * *